United States Patent [19]

Richardson

[11] 4,086,932

[45] May 2, 1978

[54] WALKING AID

[76] Inventor: Veda N. Richardson, 11068 Strathern St., Sun Valley, Calif. 91352

[21] Appl. No.: 590,145

[22] Filed: Jun. 25, 1975

[51] Int. Cl.$^2$ .............................................. F16M 13/08

[52] U.S. Cl. ...................................... 135/67; 272/70.3

[58] Field of Search ........................ 280/289; 272/70.3; 5/81 R, 81 B, 92, 317 R; 248/98, 129, 145.6; 297/5, 6; 135/67

[56] References Cited

U.S. PATENT DOCUMENTS

| | | | |
|---|---|---|---|
| 577,089 | 2/1897 | Waring | 248/98 |
| 2,487,441 | 11/1949 | Heilbroun | 248/98 |
| 2,636,207 | 4/1953 | Reece | 248/98 |
| 2,775,464 | 12/1956 | Williamson | 248/98 |
| 2,792,874 | 5/1957 | Sundberg | 297/6 X |
| 2,835,501 | 5/1958 | Chamberlin et al. | 248/98 |
| 2,998,218 | 7/1961 | Elward | 248/129 |
| 3,188,109 | 6/1965 | Broadrick | 248/129 |
| 3,306,464 | 2/1967 | Rogers | 248/129 |
| 3,553,746 | 1/1971 | Seiger | 5/92 |

FOREIGN PATENT DOCUMENTS

| | | | |
|---|---|---|---|
| 1,148,211 | 4/1969 | United Kingdom | 248/98 |

*Primary Examiner*—Werner H. Schroeder
*Assistant Examiner*—Conrad L. Berman
*Attorney, Agent, or Firm*—Keith D. Beecher

[57] ABSTRACT

A walking aid is provided for persons suffering partial paralysis from disabilities, such as strokes, accidents, or any other deterrents to walking without aid. The walking aid comprises in one embodiment, a generally horizontal bracket having two arms extending outwardly from a center point at an angle to one another, and having wheels mounted at its distal ends of the arms for rotation about a common horizontal axis, and having an upright elongated cane-like member mounted at the center. The bracket in the aforesaid embodiment includes a third arm extending outwardly from the center on the opposite side of the axis of the cane-like member, and a projection extends downwardly from the distal end of the third arm below the plane of the bracket. A generally horizontal rigid handle is mounted on the cane-like member, and the handle extends rigidly outwardly from the axis of the cane-like member generally parallel to the third arm of the bracket in the aforesaid embodiment. A tray is mounted on the upper end of the cane-like member on the same side thereof as the first two arms of the bracket, to extend over the first two arms in generally spaced and parallel relationship therewith. In a second embodiment, the third arm of the bracket is omitted and the cane-like member is mounted at the apex of the first two arms and projects downwardly below the bracket to constitute the aforesaid projection.

5 Claims, 6 Drawing Figures

WALKING AID

BACKGROUND OF THE INVENTION

A common result of a stroke, accident, or other deterrent, is that the person suffering the stroke or accident is left with either his right side or left side paralyzed, and he is at least temporarily deprived of the use of either the right arm and right leg, or of the left arm and left leg. Canes are presently available which are designed particularly for stroke patients to provide them with some degree of mobility. However, such canes are not particularly stable, and even with the use of the prior art canes, the mobility and independence of the patient is seriously impaired.

For example, it is practically impossible for the partially paralyzed patient using the prior art to carry anything from one place to another, since his only effective arm and hand are used to support himself on the cane. This means that the partially paralyzed patient, although able to move himself about from one place to another, cannot visit a store and make a purchase by himself, cannot bring food or drink for himself to the table, cannot select a book from a bookcase and carry it across the room, and so on.

The walking aid of the present invention is intended to overcome the deficiencies of the prior art canes, and to provide not only an extremely stable yet mobile support for the patient, but also to provide some means for carrying articles from one place to another. The walking aid of the invention provides stability, mobility, and the independence necessary for the physical and mental rehabilitation of the patient. The use of the walking aid of the invention provides the handicapped person with a means to achieve a degree of independence, both in the home and for shopping and other external activities.

DETAILED DESCRIPTION OF THE ILLUSTRATED EMBODIMENT

Figure 1:
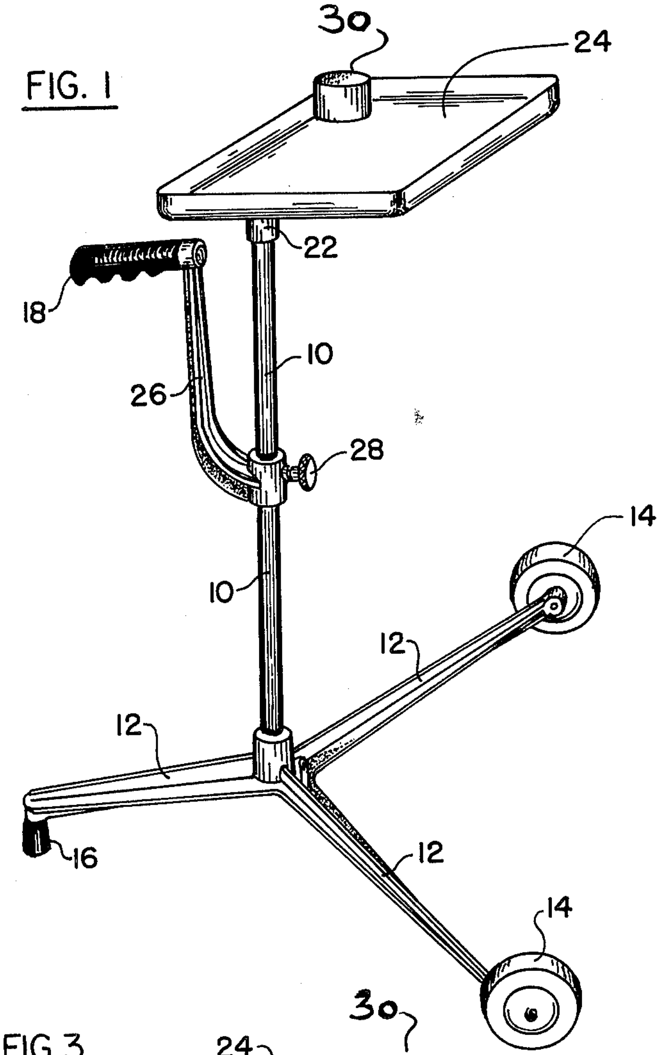
FIG. 1 is a perspective view of one embodiment of the invention taken from the top and to one side.
Figure 2:
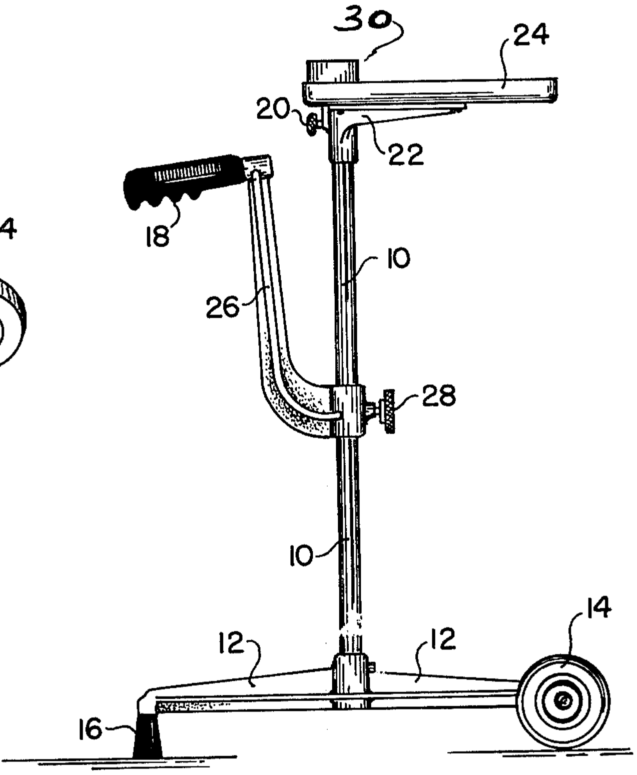
FIG. 2 is a side elevation of the embodiment of FIG. 1.
Figure 3:
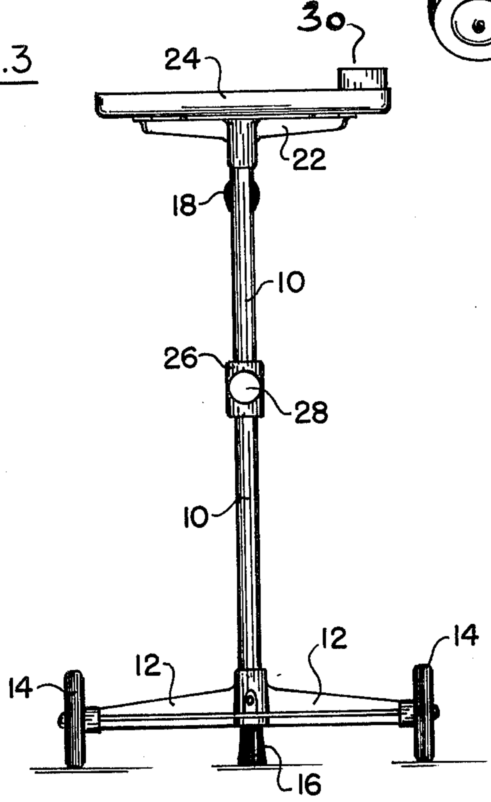
FIG. 3 is a front elevation of the embodiment of FIG. 1.

As shown in the drawings, the walking aid of the present invention, in the embodiment of FIGS. 1–3, comprises an upright or upstanding elongated cane-like member 10 which is rigid in nature, and which may be formed of metal, or other appropriate material. A generally horizontal bracket is welded, or otherwise affixed to its center to the lower end of the cane-like member 10. A first pair of arms 12 of the bracket extend outwardly from its center, and a pair of wheels 14 are mounted at the distal ends of the first two arms 12 in spaced relationship, as shown, for rotation about a common horizontal axis.

The bracket has a third arm 12 which extends outwardly from its center on the opposite side of the axis of the cane-like member 10, and a projection 16 extends downwardly from the distal end of the third arm 12 beyond the plane of the bracket.

A rigid handle 18 is mounted to the cane-like member 10 by a bracket 26, and it can be set at different heights on the cane-like member by a set screw 28. The handle extends outwardly from the longitudinal axis of the cane-like member on the opposite side thereof from the first two arms 12 of the bracket, and is directly over and in essentially spaced and parallel relationship with the third arm 12.

A further bracket 22 is secured to the top of the cane-like member 10 by a set screw 20, and a tray 24 is mounted on the bracket 22. The arms of bracket 22 and tray 24 extend on the same side of the axis of the cane-like member 10 as the first two arms of the bracket, to be directly over and in generally spaced and parallel relationship with the first two arms of the bracket. A cylindrical bracket 20 is welded, or otherwise attached to the tray 24 to support a cup or glass. The bracket 26 is adjustable to different positions on the cane-like member 10 to accommodate the walking aid to people of different heights. The tray 24 may have any appropriate configuration. It may, for example, include a basket, and appropriate brackets (such as bracket 30) for cups, glasses, and other liquid containers. The tray also may be adjustable up and down the cane-like member to be usable in a standing or seated position. As an alternative, the cane-like member itself may have a telescoping configuration. If desired, the cane-like member can be formed of hinged sections to permit it to be used on stairs or in a sitting position.

In the operation of the walking aid, the patient grasps the handle 18, and as he presses his weight down on the handle 18, all his weight is supported rigidly and with a high degree of of stability by the projection 16 and the bracket arms 12. When the patient wishes to take a step forward, he turns the handle 18 upwardly, and thus turns the cane-like member 10 about the horizontal axis of rotation of the wheels 14. This action effectively lifts the projection 16 up off the supporting surface, and enables the patient to move forwardly as the wheels 14 turn. At the completion of the forward step, the patient again bears down on the handle 18, and all his weight is taken by the projection 16. Various articles may be placed in the tray 24 by the patient, to be carried to various locations as the patient moves about without any requirement for human assistance.

Figure 4:
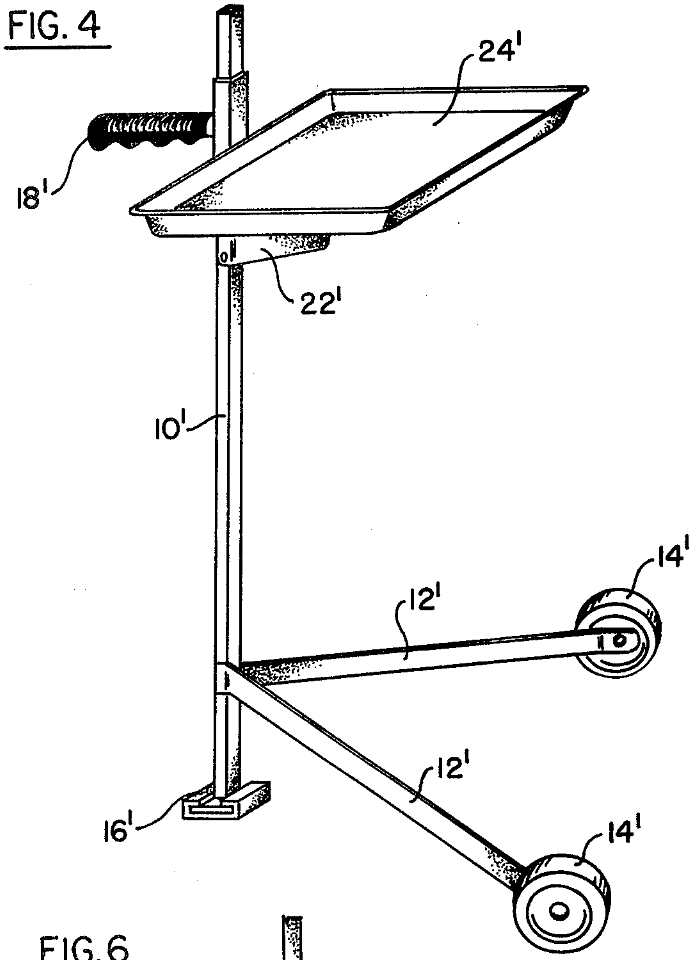
FIG. 4 is a perspective view of a second embodiment.
Figure 5:
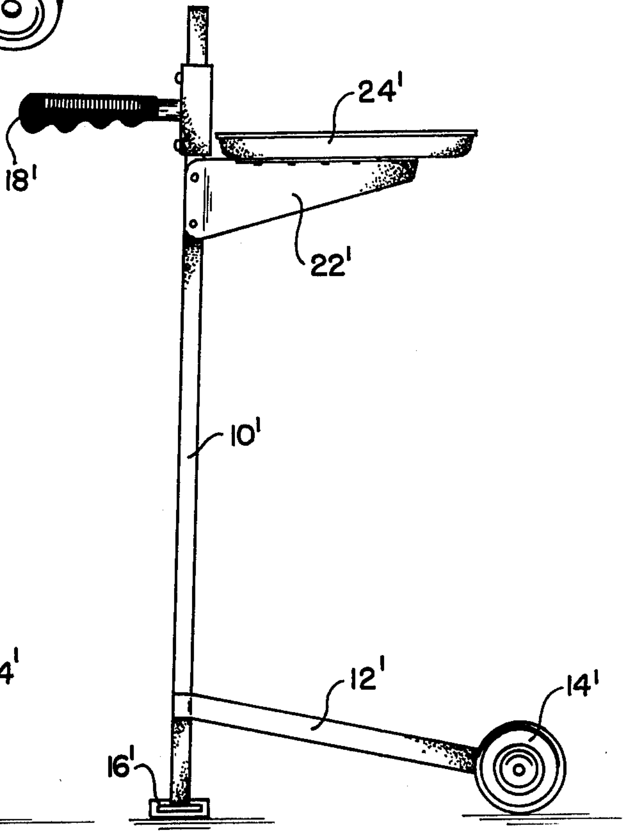
FIGS. 5 and 6 are side and front elevations, respectively, of the embodiment of FIG. 4.
Figure 6:
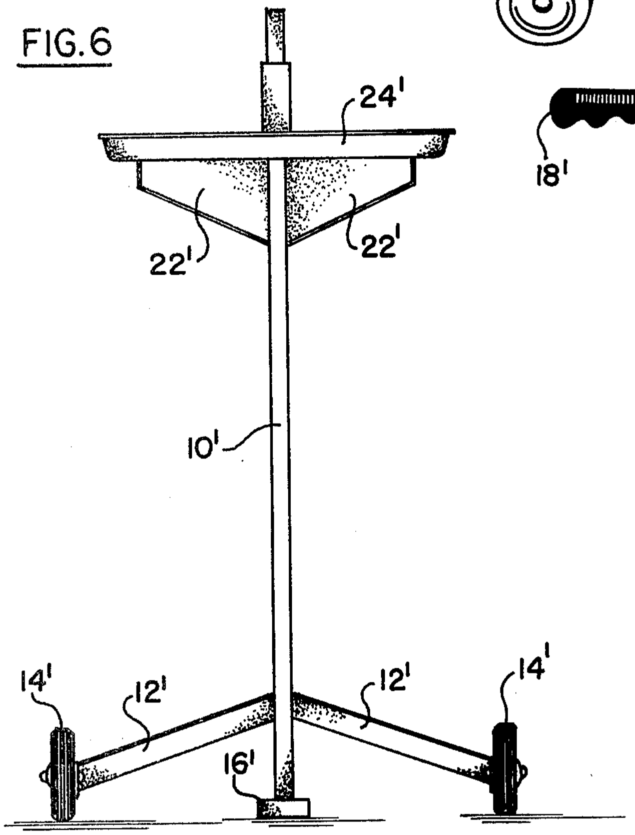

The embodiment of FIGS. 4–6 is generally similar to the embodiment of FIGS. 1–3, and like elements have been designated by the same numbers primed. The second embodiment has a high degree of stability because the lower end of the cane-like member 10' directly engages the ground.

The latter embodiment includes a generally horizontal V-shaped bracket 12' having wheels 14' mounted at its distal ends for rotation about a common horizontal axis, and having the cane-like member mounted in an upright position at its apex. The lower end of the cane-like member extends down below the plane of the bracket, as shown.

The arms 12 or 12' may be foldable to facilitate storage of the aid. The tray 24 or 24' may also be foldable or removable.

It will be appreciated that while particular embodiments of the invention have been shown and described, modifications may be made. It is intended in the claims to cover the modifications which come within the spirit and scope of the invention. What is claimed is:

1. A walking aid comprising: a generally horizontal bracket having first and second arms extending outwardly in a generally horizontal plane from a converging point in the plane; a pair of wheels mounted on the respective distal ends of the first and second arms of the bracket in spaced relationship for rotation about a common axis; an upstanding elongated cane-like member mounted at the converging point of the first and second arms of the bracket at a position displaced from the axis of rotation of the wheels and extending upwardly from said horizontal plane; a projection member extending downwardly below the horizontal plane to support a downward weight exerted on the cane-like member a handle mounted on the cane-like member comprising a rigid elongated member extending outwardly from the axis of the cane-like member; and a generally horizontal tray mounted on the upper end of said cane-like member on the other side thereof from the handle.

2. The walking aid defined in claim 1, in which the bracket includes a third arm extending outwardly from the center thereof on the opposite side of the axis of said cane-like member, and in which said projection member extends downwardly from the distal end of the third arm.

3. The walking aid defined in claim 2, in which said third arm of the bracket is disposed directly under the handle in spaced relationship therewith.

4. The walking aid defined in claim 1, in which the lower end of the cane-like member extends downwardly below the plane of the bracket to constitute said projection member.

5. The walking aid defined in claim 1, in which the handle is adjustable along the cane-like member.

* * * * *